United States Patent
Lin

(10) Patent No.: US 9,682,776 B2
(45) Date of Patent: Jun. 20, 2017

(54) FLYABLE SAILBOAT

(71) Applicant: Chen-Hsin Lin, New Taipei (TW)

(72) Inventor: Chen-Hsin Lin, New Taipei (TW)

( * ) Notice: Subject to any disclaimer, the term of this patent is extended or adjusted under 35 U.S.C. 154(b) by 0 days.

(21) Appl. No.: 15/066,317

(22) Filed: Mar. 10, 2016

(65) Prior Publication Data

US 2016/0264241 A1    Sep. 15, 2016

(30) Foreign Application Priority Data

Mar. 11, 2015   (TW) .............................. 104203574 U

(51) Int. Cl.
| | | |
|---|---|---|
| B64C 25/50 | (2006.01) | |
| B64C 37/00 | (2006.01) | |
| B64C 35/00 | (2006.01) | |
| B63B 15/00 | (2006.01) | |
| B63B 43/12 | (2006.01) | |
| B63H 13/00 | (2006.01) | |
| B63H 9/08 | (2006.01) | |

(52) U.S. Cl.
CPC .............. B64C 37/00 (2013.01); B63B 15/00 (2013.01); B63B 43/12 (2013.01); B63H 13/00 (2013.01); B64C 35/00 (2013.01); *B63B 2015/0075* (2013.01); *B63H 9/08* (2013.01); *Y02T 70/58* (2013.01)

(58) Field of Classification Search
CPC ....... B64C 37/00; B34C 35/00; B34C 35/001; B34C 35/002; B34C 35/003; B34C 35/005; B34C 35/006; B34C 35/007; B34C 35/008; B60F 5/02; B60F 5/003
See application file for complete search history.

(56) References Cited

U.S. PATENT DOCUMENTS

| | | | | |
|---|---|---|---|---|
| 2,940,688 | A * | 6/1960 | Bland ....................... | B60F 3/00 114/102.16 |
| 5,181,674 | A * | 1/1993 | Apgar .................. | B63H 9/0607 114/273 |
| 6,691,632 | B2 * | 2/2004 | Stevens ................. | B62B 15/002 114/272 |
| 7,048,227 | B2 * | 5/2006 | Towley, III ............... | B60F 5/02 244/13 |
| 7,252,264 | B2 * | 8/2007 | Nattinger ............. | B63H 9/0607 114/39.21 |

* cited by examiner

*Primary Examiner* — Richard G Davis
(74) *Attorney, Agent, or Firm* — Guice Patents PLLC

(57) ABSTRACT

A flyable sailboat includes: a floating member, having a front support, a rear support and one or more air pumps, wherein the top end of the front support is installed with at least one rotating device; one or more rear flaps, installed at the tail end of the floating member and respectively including a horizontal flap and a rotating vertical rudder; two or more lateral flaps, respectively extended from two lateral sides of the floating member; at least one wind resisting device, installed on the rotating device and including at least one sail, at least one boom rod and at least one horizontal rod, wherein the center of the sail is installed with the boom rod having a tail rod and fastened on the rotating device; and one or more power devices, installed at the tail end or at two lateral sides of the floating member.

8 Claims, 9 Drawing Sheets

FLYABLE SAILBOAT

BACKGROUND OF THE INVENTION

1. Field of the Invention

The present invention relates to a sailboat, especially to a flyable sailboat in which a wind resisting device is able to be rotated for enabling a tail rod of a boom rod to be fastened above the location of a floating member defined at the bottom end of a rotating device of a front support, so a sail is in a vertical status, or the tail rod of the boom rod of the wind resisting device is fastened on a buckle device of a rear support, so the sail is in a horizontal status.

2. Description of Related Art

In a conventional sailboat, the boom rod installed with a sail is formed as a fixed structure fastened at the center of the boat body, because the structure is fixed and unable to be altered, the sailboat can only provide a sailing function and cannot be altered for being served as a flying craft, so the applicable field is very much limited; moreover, the conventional sailboat is not provided with a structure for preventing the sailboat from turning over, so the sailboat may easily turn over and the operator would fall into water, thereby increasing the inconvenience and danger in operation; furthermore, besides the conventional sailboat is not provided with an altering function, the difficulty in operating the sailboat itself is relatively high, the operator has to be specially trained and the difficulty is so high that not all age levels are suitable for such operation, thus the fun of sailing cannot be wildly provided; the above-mentioned disadvantages shall be seriously concerned by customers and skilled people in the art. Accordingly, the present invention provides a flyable sailboat, in which a wind resisting device installed on a rotating device of a front support is rotated for enabling a tail rod of a boom rod to be fastened above the location of a floating member defined at the bottom end of the rotating device of the front support, so a sail is in a vertical status, or the tail rod of the boom rod of the wind resisting device is fastened on a buckle device of a rear support, so the sail is in a horizontal status, and air bags at the top ends of lateral flaps at two lateral sides of the floating member can be utilized for providing buoyance so as to prevent the floating member from turning over towards any side; moreover, the wind resisting device can be altered according to the requirement of a user for enabling the floating member to be served as a sailboat or a flying craft; thus the convenience in operation and more fun can be provided.

SUMMARY OF THE INVENTION

One primary objective of the present invention is to provide a flyable sailboat, in which a wind resisting device installed on a rotating device of a front support is rotated for enabling a tail rod of a boom rod to be fastened above the location of a floating member defined at the bottom end of the rotating device of the front support, so a sail is in a vertical status, or the tail rod of the boom rod of the wind resisting device is fastened on a buckle device of a rear support, so the sail is in a horizontal status, thereby improving the disadvantages existed in prior art.

Another objective of the present invention is to provide a flyable sailboat, in which air bags at the top ends of lateral flaps at two lateral sides of a floating member can be utilized for providing buoyance so as to prevent the floating member from turning over towards any side.

One another objective of the present invention is to provide a flyable sailboat, in which a wind resisting device can be altered according to the requirement of a user for enabling a floating member to be served as a sailboat or a flying craft.

Still one another objective of the present invention is to provide a flyable sailboat capable of providing the convenience and more fun in operation.

The problem to be solved by the present invention is that: in a conventional sailboat, the boom rod installed with a sail is formed as a fixed structure fastened at the center of the boat body, because the structure is fixed and unable to be altered, the sailboat can only provide a sailing function and cannot be altered for being served as a flying craft, so the applicable field is very much limited; moreover, the conventional sailboat is not provided with a structure for preventing the sailboat from turning over, so the sailboat may easily turn over and the operator would fall into water, thereby increasing the inconvenience and danger in operation; furthermore, besides the conventional sailboat is not provided with an altering function, the difficulty in operating the sailboat itself is relatively high, the operator has to be specially trained and the difficulty is so high that not all age levels are suitable for such operation, thus the fun of sailing cannot be wildly provided.

Accordingly, the present invention provides a flyable sailboat, which includes:

- a floating member, the front portion defined at the top end thereof is installed with a front support, the top end of the front support is installed with at least one rotating device, the middle portion defined at the top end of the floating member is installed with a rear support, the top end of the rear support is installed with at least one buckle device, and the floating member is installed with one or a plurality of air pumps;
- one or a plurality of rear flaps, installed at the tail end of the floating member and respectively including a horizontal flap and a rotating vertical rudder, wherein the center defined at the bottom end of the horizontal flap is installed with the rotating vertical rudder extended to the bottom end of the floating member;
- two or a plurality of lateral flaps, respectively extended from two lateral sides of the floating member, wherein the lateral flap is formed as a plate-like member, and the top end of the lateral flap is installed with one or a plurality of air bags communicated with the air pump for blowing or discharging;
- at least one wind resisting device, installed on the rotating device of the front support of the floating member, and including at least one sail, at least one boom rod and at least one horizontal rod, wherein the center of the sail is installed with the boom rod having a tail rod and fastened on the rotating device, the horizontal rod is vertically installed on the boom rod and connected to the sail, the tail rod of the boom rod is respectively and correspondingly fastened with the buckle device of the rear support of the floating member and at the location of the floating member defined at the bottom end of the rotating device of the front support; and
- one or a plurality of power devices, installed at the tail end or at two lateral sides of the floating member.

Furthermore, the present invention includes an air bag installed on the horizontal flap of the rear flap and communicated with the air pump for blowing or discharging.

Preferably, according to the present invention, the rotating device installed on the front support of the floating member is able to vertically or horizontally rotate in a two dimensional or three dimensional manner.

Preferably, according to the present invention, the lateral flap is rotatable.

Comparing with prior art, advantages achieved by the present invention are as followings: the wind resisting device installed on the rotating device of the front support is able to be rotated, the tail rod of the boom rod is fastened above the location of the floating member defined at the bottom end of the rotating device of the front support, so the sail is in a vertical status, or the tail rod of the boom rod of the wind resisting device is fastened on the buckle device of the rear support, so the sail is in a horizontal status, and the air bags at the top ends of the lateral flaps at the two lateral sides of the floating member can be utilized for providing buoyance so as to prevent the floating member from turning over towards any side; moreover, the wind resisting device can be altered according to the requirement of a user for enabling the floating member to be served as the sailboat or the flying craft, thereby increasing the convenience and fun in operation. Accordingly, the present invention is novel and more practical in use comparing with prior art.

DETAILED DESCRIPTION OF THE PREFERRED EMBODIMENT

Figure 1:
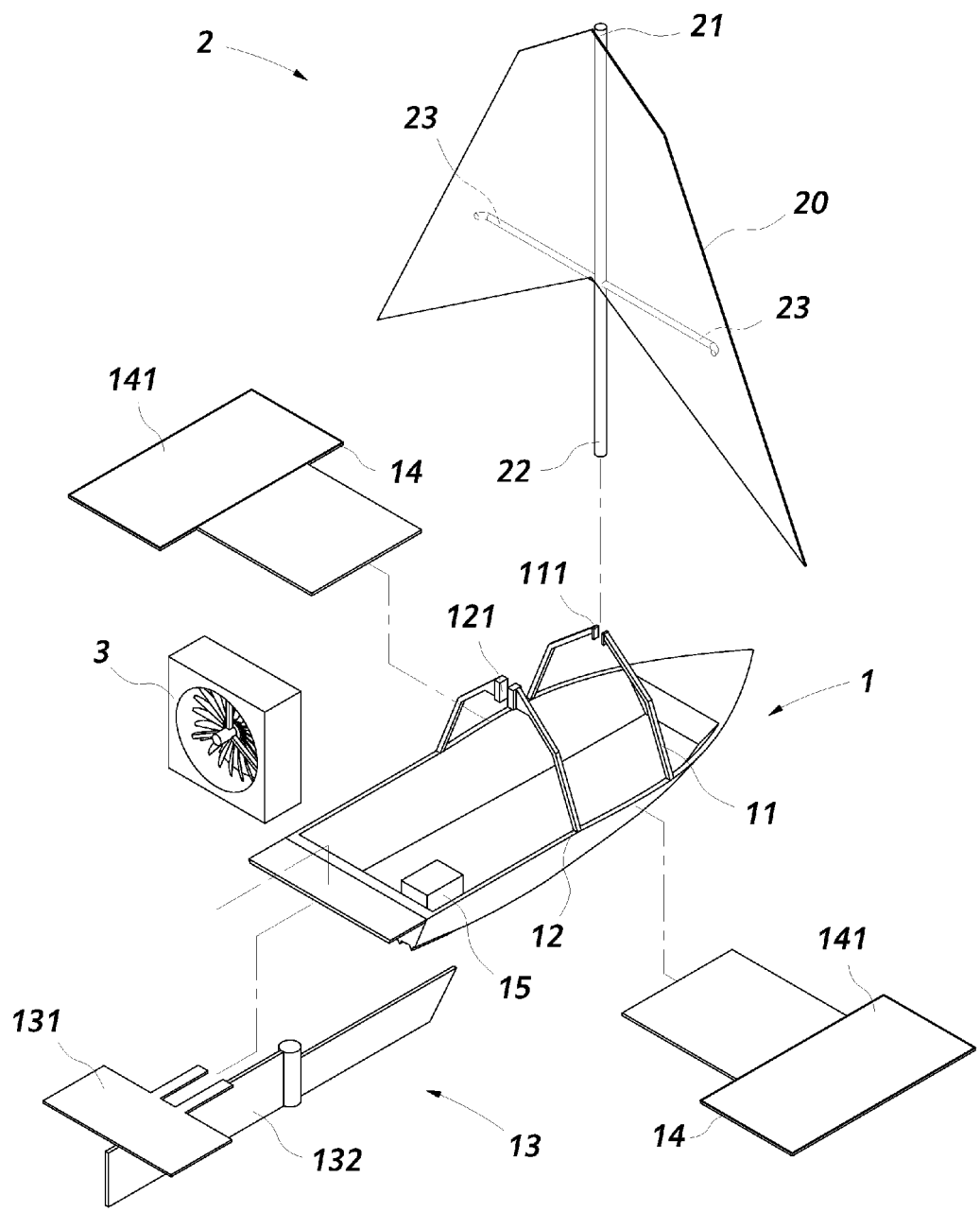
FIG. 1 is a perspective exploded view according to the present invention.
Figure 2:
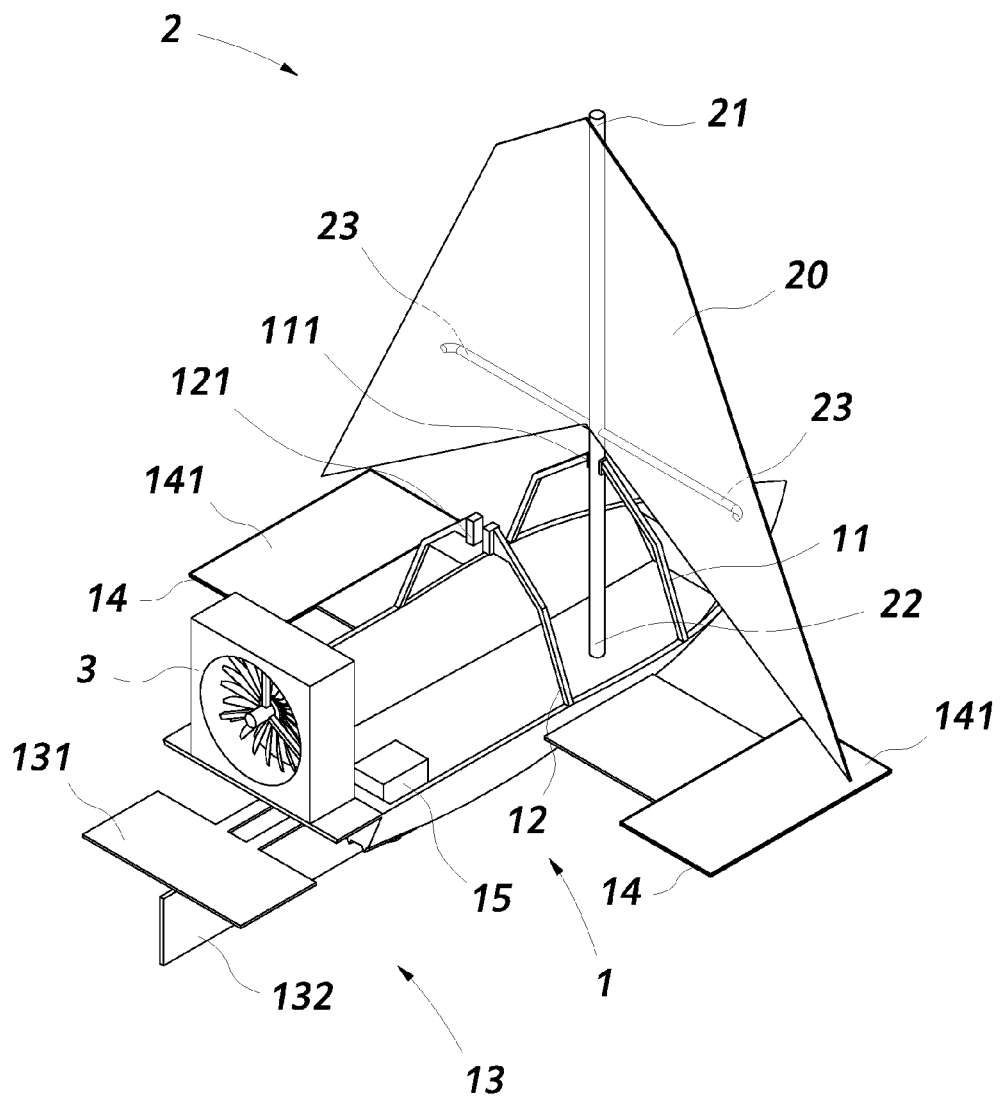
FIG. 2 is a perspective view showing the assembly according to the present invention.
Figure 3:
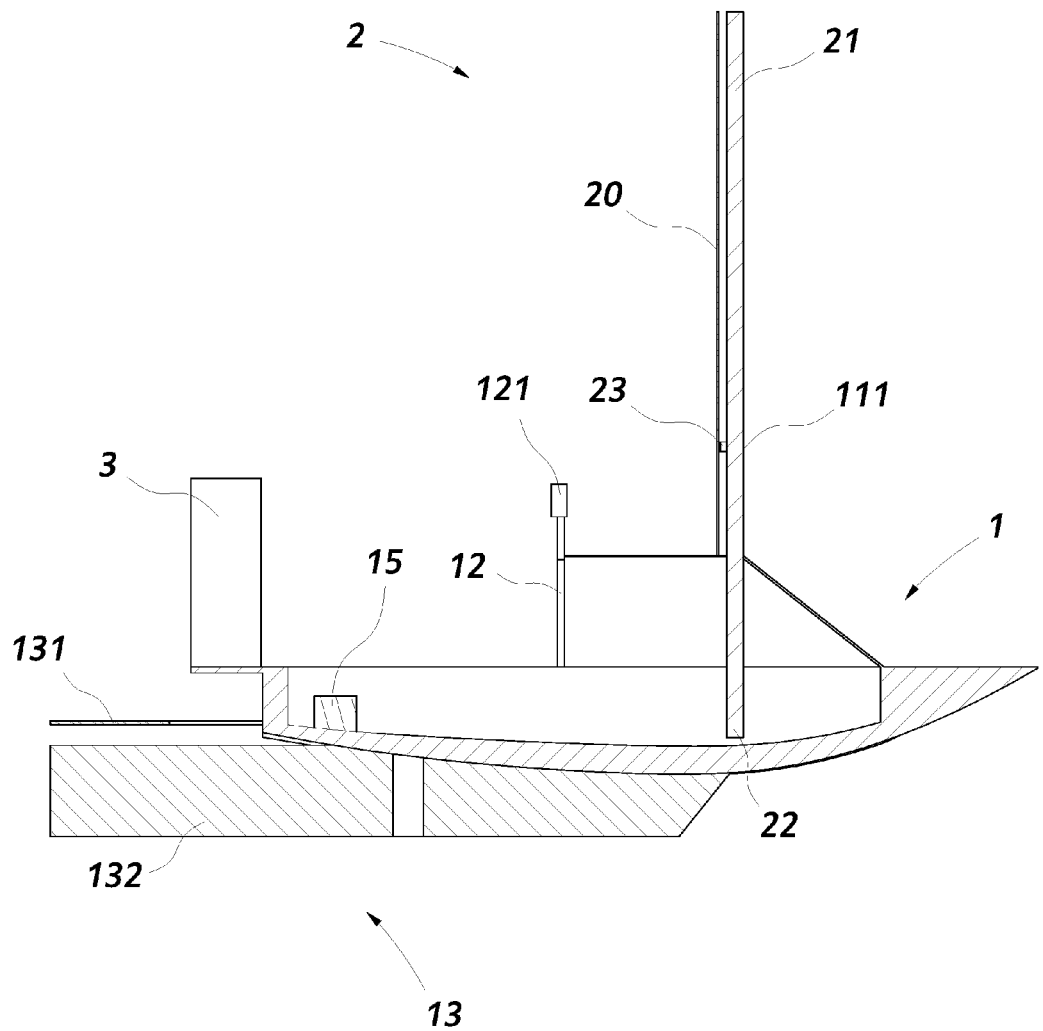
FIG. 3 is a cross sectional view showing the assembly according to the present invention.
Figure 4:
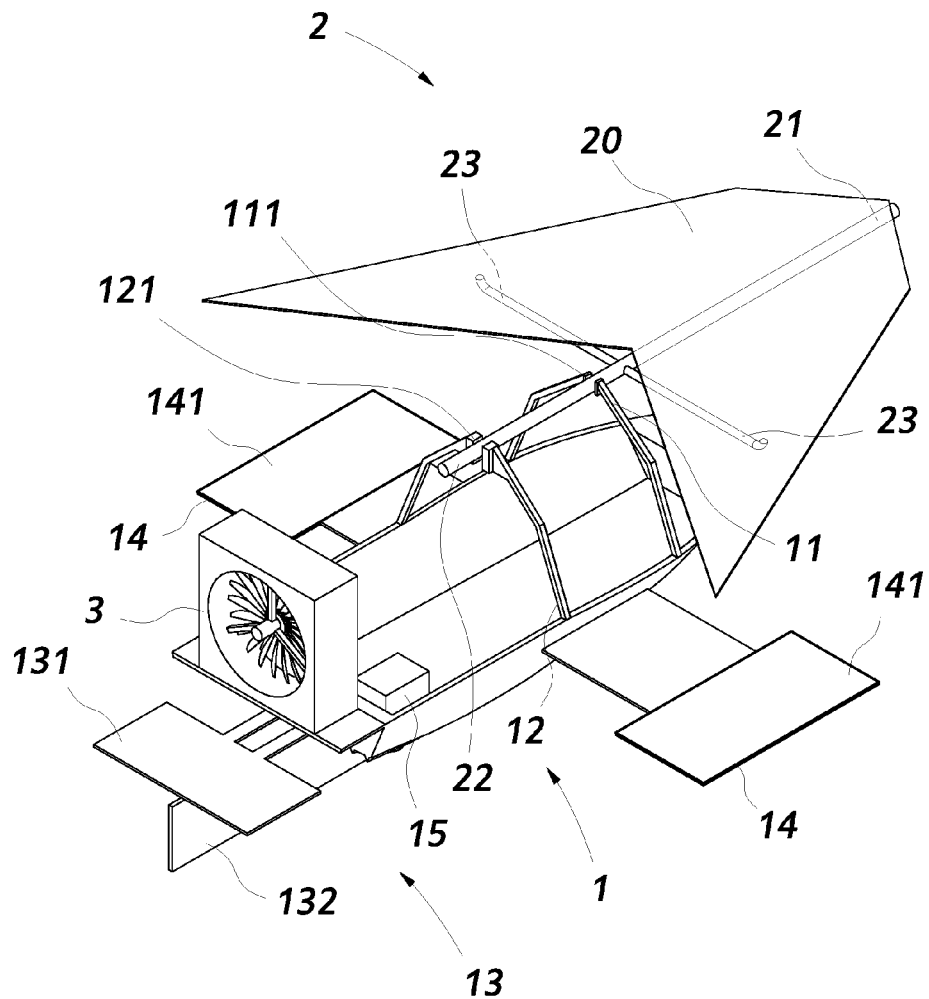
FIG. 4 is a perspective view showing the wind resisting device being in a horizontal status according to the present invention.
Figure 8:
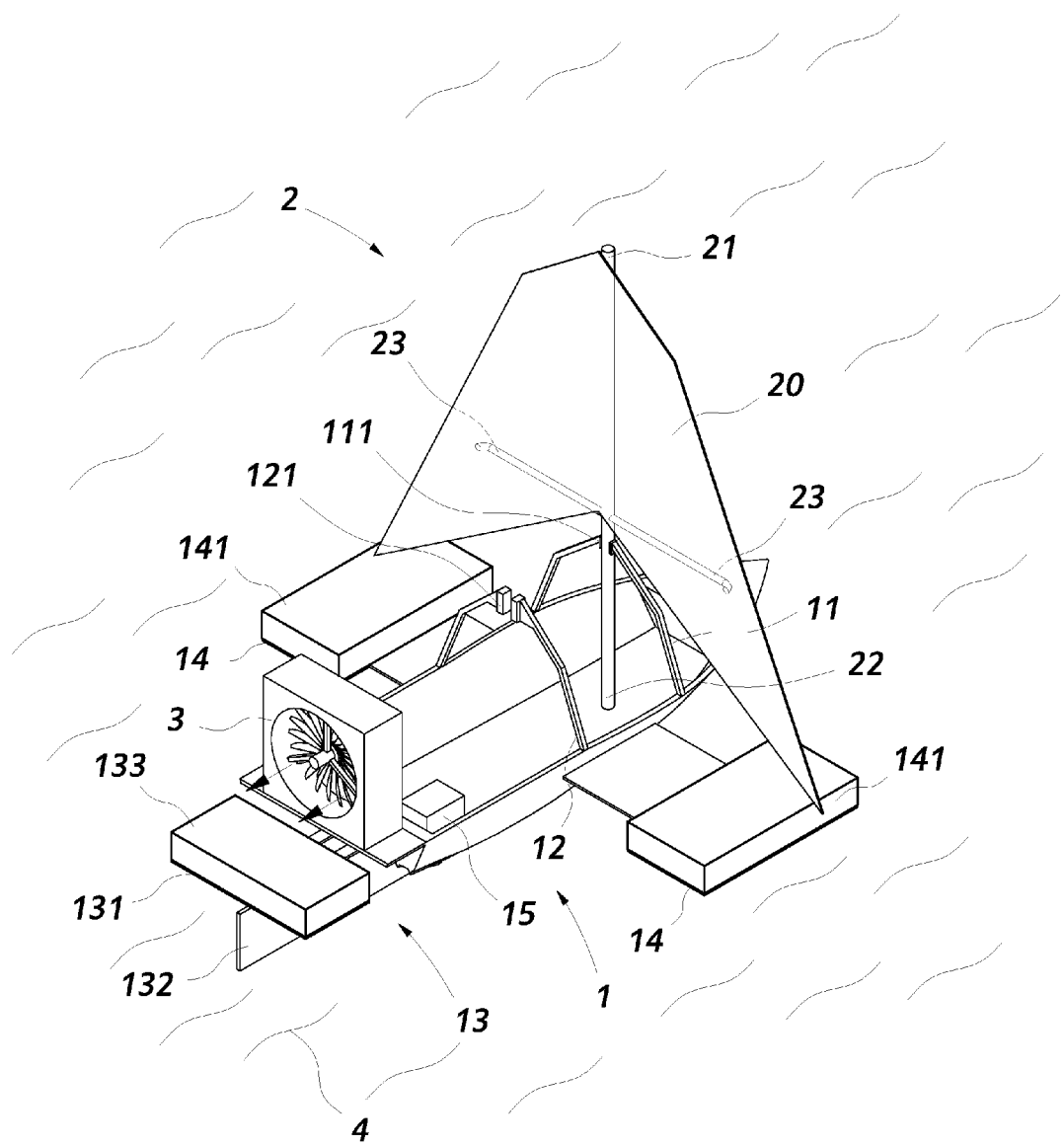
FIG. 8 is a schematic view showing the rear flap being installed with the air bag according to one embodiment of the present invention.
Figure 9:
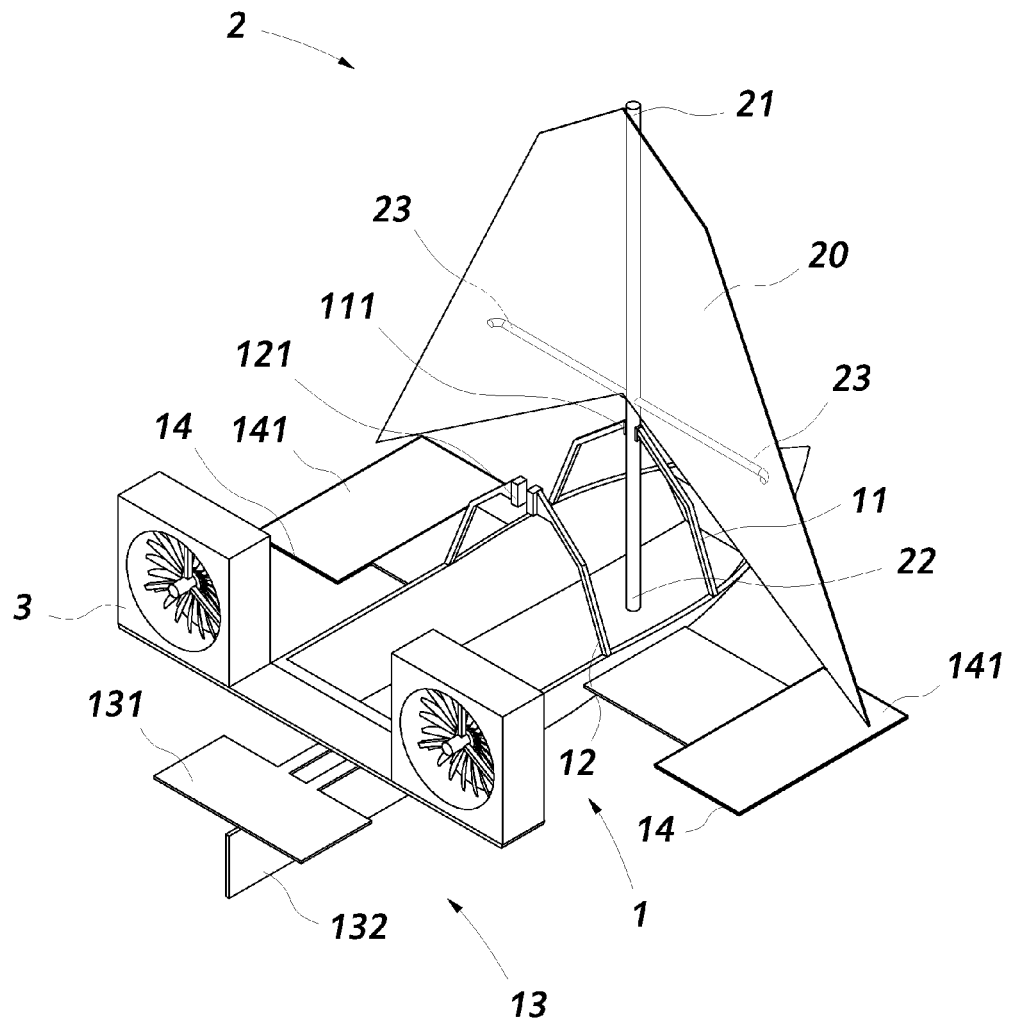
FIG. 9 is a schematic view showing the power devices being installed at two lateral sides of the floating member according to one embodiment of the present invention.

Referring to FIG. 1, FIG. 2, FIG. 3, FIG. 4, FIG. 8 and FIG. 9, wherein FIG. 1 is a perspective exploded view according to the present invention; FIG. 2 is a perspective view showing the assembly according to the present invention; FIG. 3 is a cross sectional view showing the assembly according to the present invention; FIG. 4 is a perspective view showing the wind resisting device being in a horizontal status according to the present invention; FIG. 8 is a schematic view showing the rear flap being installed with the air bag according to one embodiment of the present invention; and FIG. 9 is a schematic view showing the power devices being installed at two lateral sides of the floating member according to one embodiment of the present invention. According to one preferred embodiment, the present invention provides a flyable sailboat, which includes a floating member 1, one or a plurality of rear flaps 13, two or a plurality of lateral flaps 14, at least one wind resisting device 2, and one or a plurality of power devices 3.

The front portion defined at the top end of the floating member 1 is installed with a front support 11, the top end of the front support 11 is installed with at least one rotating device 111, according to this embodiment, the rotating device 111 of the floating member 1 is able to vertically or horizontally rotate in a two dimensional or three dimensional manner, the middle portion defined at the top end of the floating member 1 is installed with a rear support 12, the top end of the rear support 12 is installed with at least one buckle device 121, and the floating member 1 is installed with one or a plurality of air pumps 15 for blowing or discharging air.

The one or a plurality of rear flaps 13 are installed at the tail end of the floating member 1, and respectively include a horizontal flap 131 and a rotating vertical rudder 132, wherein the center defined at the bottom end of the horizontal flap 131 is installed with the rotating vertical rudder 132 extended to the bottom end of the floating member 1; the rear flap 13 is served to provide buoyancy and to ensure the safety to the floating member 1, the horizontal flap 131 thereof can be further installed with an air bag 133 (as shown in FIG. 8) communicated with the air pump 15 of the floating member 1 for blowing or discharging.

The two or a plurality of lateral flaps 14 are respectively extended from two lateral sides of the floating member 1, the lateral flap 14 is formed as a plate-like member; for preventing the floating member 1 from turning over during voyage and for being served as a flying craft, the top end of the lateral flap 14 is installed with one or a plurality of air bags 141 communicated with the air pump 15 of the floating member 1 for blowing or discharging, according to this embodiment, the rotating angle of the lateral flap 14 is adjustable.

The at least one wind resisting device 2 is installed on the rotating device 111 of the front support 11 of the floating member 1, and includes at least one sail 20, at least one boom rod 21 and at least one horizontal rod 23, wherein the center of the sail 20 is installed with the boom rod 21 having a tail rod 22 and fastened on the rotating device 111 of the front support 11, the horizontal rod 23 is vertically installed on the boom rod 21 and connected to the sail 20, the tail rod 22 of the boom rod 21 is respectively and correspondingly fastened with the buckle device 121 of the rear support 12 of the floating member 1 and at the location of the floating member 1 defined at the bottom end of the rotating device 111 of the front support 11.

The one or a plurality of power devices 3 are installed at the tail end of the floating member 1 (as shown in FIG. 1 to FIG. 4 and FIG. 8), but what shall be addressed is that the scope of the present invention is not limited to the above-mentioned arrangement, the one or a plurality of power devices 3 can also be installed at two lateral sides of the floating member 1 (as shown in FIG. 9) or other locations.

According to the present invention, when the wind resisting device 2 is desired to be arranged in a horizontal status, referring to FIG. 4, the boom rod 21 which is originally in a vertical status and the tail rod 22 fastened at the location of the floating member 1 defined at the bottom end of the rotating device 111 of the front support 11 (as shown from FIG. 1 to FIG. 3) are rotated with the rotating device 111 of the front support 11 being served as a shaft core, so the tail rod 22 of the boom rod 21 is displaced to the buckle device 121 of the rear support 12 of the floating member 1 for being buckled, at this moment the boom rod 21 having the tail rod 22 is horizontally fastened on the front support 11 and the rear support 12 for being served as a primary wing of the flying craft (as shown in FIG. 4).

Figure 5:
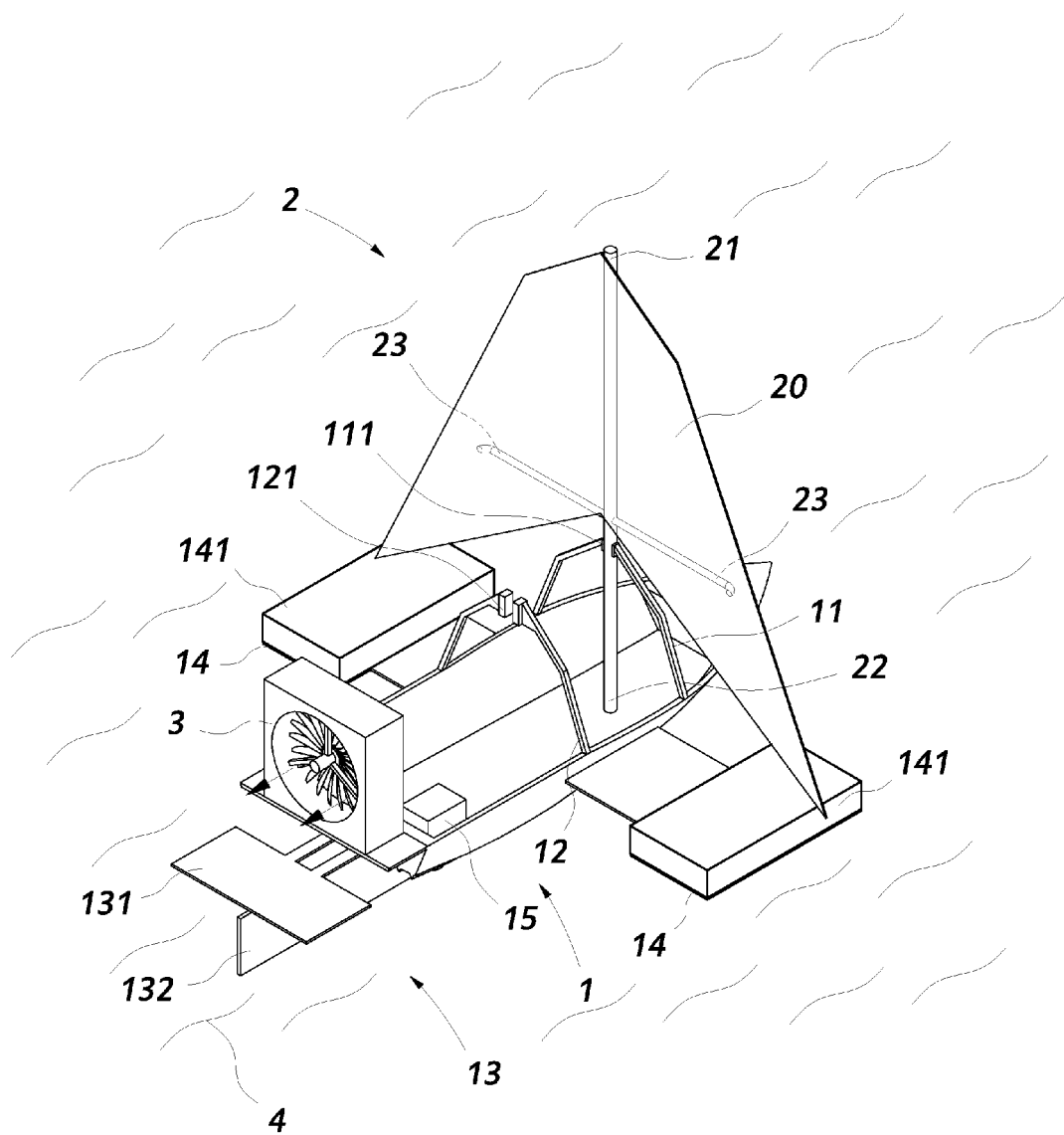
FIG. 5 is a schematic view showing the present inventing being served as a sailboat voyaging on the water according to one embodiment of the present invention.
Figure 6:
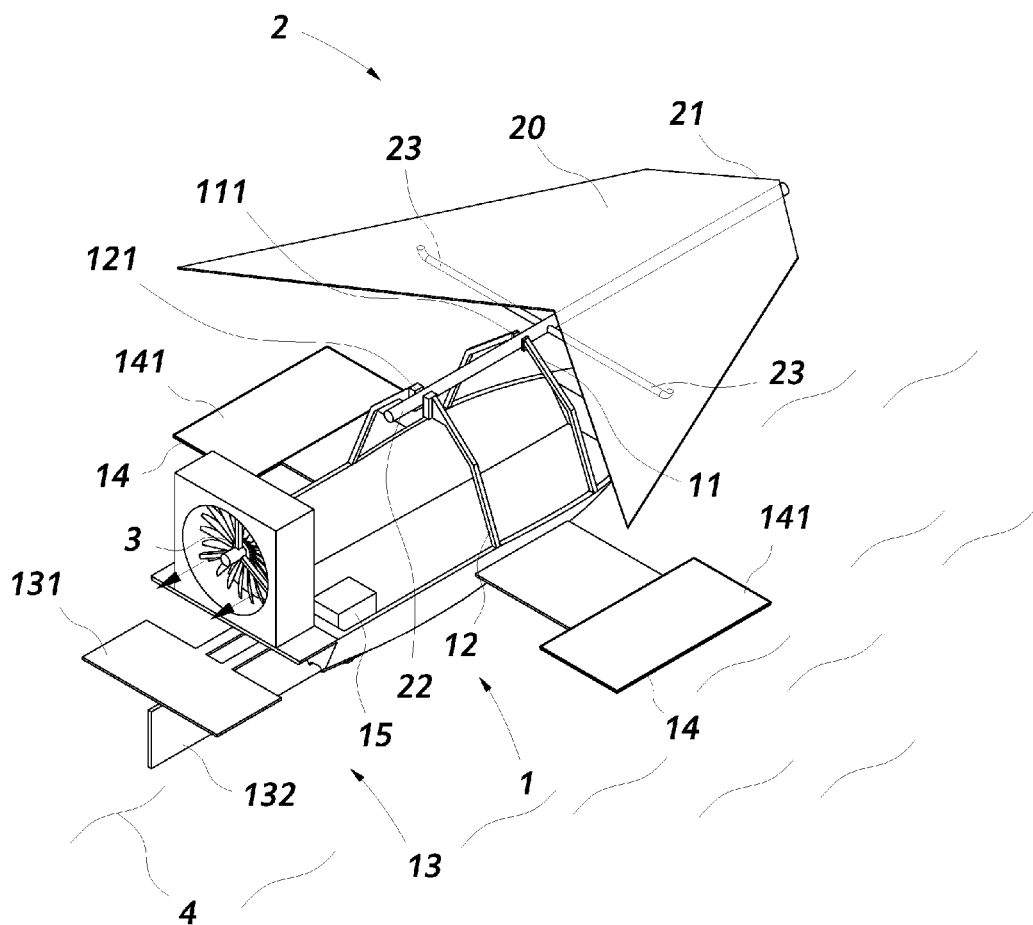
FIG. 6 is a schematic view showing the present inventing being served as a flying craft flying above the water according to one embodiment of the present invention.

Referring to FIG. 5 and FIG. 6, wherein FIG. 5 is a schematic view showing the present inventing being served as a sailboat voyaging on the water according to one embodiment of the present invention; and FIG. 6 is a schematic view showing the present inventing being served as a flying craft flying above the water according to one embodiment of the present invention. When the present invention is served as the sailboat for voyaging on the water, the wind resisting device 2 is arranged in a vertical status (as shown from FIG. 1 to FIG. 3), and the air bags 141 at the top ends of the lateral flaps 14 at the two lateral sides of the floating member 1 and the air pump 15 of the floating member 1 are utilized for blowing or discharging air for enabling the floating member 1 to voyage or stop on the water 4 without worrying about turning over (as shown in FIG. 5), and the air bag 133, communicated with the air pump 15 of the floating member 1, of the horizontal flap 131 of the rear flap 13 can also be utilized for blowing or discharging so as to enhance the effect (as shown in FIG. 8), thereby increasing the buoyance and stability. According to the present invention, the sail 20 of the wind resisting device 2 can be utilized for collecting wind forces so as to provide the power for forwardly moving the floating member 1 which is served as the sailboat, the rotating vertical rudder 132 of the rear flap 13 can be utilized for controlling the direction of the floating member 1, the horizontal rod 23 of the wind resisting device 2 and the rotating device 111 of the front support 11 can be utilized for adjusting and rotating the direction of the sail 20, and the power device 3 can be utilized for providing the power to forwardly move the floating member 1 (as shown in FIG. 5); when the present invention is desired to be served as a flying craft for flying above the water 4, the wind resisting device 2 is horizontally fastened on the rotating device 111 of the front support 11 of the floating member 1 and the buckle device 121 of the rear support 12 (as shown in FIG. 4), at this moment the air bags 141 at the top ends of the lateral flaps 14 at the two lateral sides of the floating member 1 are discharged for being formed as plate-like members or the air bag 133 installed on the horizontal flap 131 of the rear flap 13 is discharged, the horizontal flap 131 of the rear flap 13 is utilized for maintaining the horizontal status, the rotating vertical rudder 132 is utilized for controlling the flying direction of the floating member 1, the power device 3 of the floating member 1 is utilized for providing the power for enabling the floating member 1 to fly, and the lateral flaps 14 at the two lateral sides of the floating member 1 are utilized for assisting the floating member 1 to ascend/descend (as shown in FIG. 6).

Figure 7:
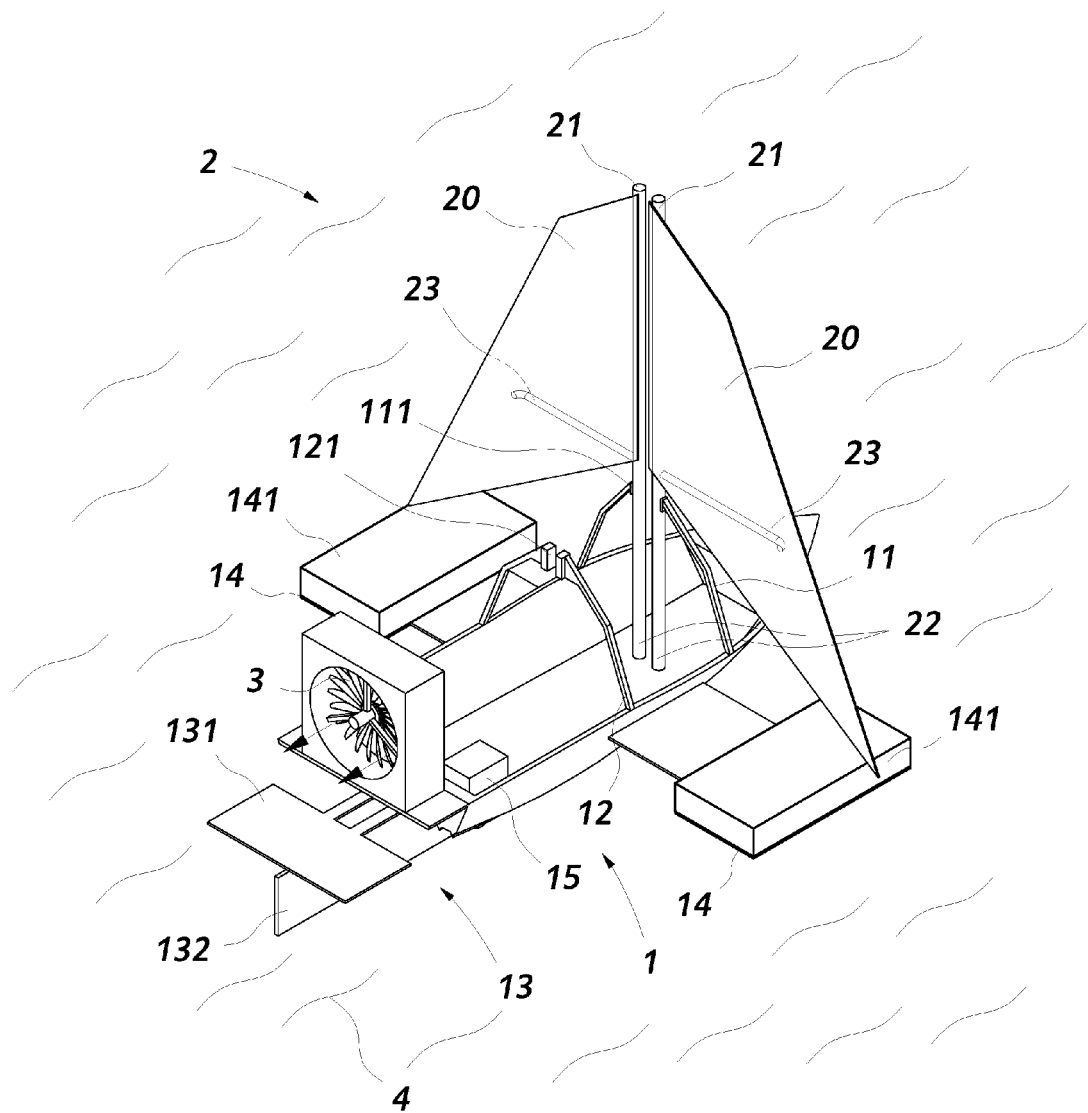
FIG. 7 is a schematic view showing the wind resisting device having two sails according to one embodiment of the present invention.

Referring to FIG. 7, which is a schematic view showing the wind resisting device having two sails according to one embodiment of the present invention. According to the present invention, the at least one wind resisting device 2 cannot only be one unit of the sail 20 (as shown from FIG. 1 to FIG. 6 and FIG. 8 and FIG. 9), an embodiment disclosed in FIG. 7 shows that the at least one wind resisting device 2 can also be two units of the sails 20, but what shall be addressed is that the scope of the present invention is not limited to the above-mentioned arrangement, the sail 20 can also be three or more units.

Accordingly, the wind resisting device 2 installed on the rotating device 111 of the front support 11 is able to be rotated, the tail rod 22 of the boom rod 21 is fastened above the location of the floating member 1 defined at the bottom end of the rotating device 111 of the front support 11, so the sail 20 is in a vertical status, or the tail rod 22 of the boom rod 21 of the wind resisting device 2 is fastened on the buckle device 121 of the rear support 12, so the sail 20 is in a horizontal status, and the air bags 141 at the top ends of the lateral flaps 14 at the two lateral sides of the floating member 1 can be utilized for providing buoyance so as to prevent the floating member 1 from turning over towards any side; moreover, the wind resisting device 2 can be altered according to the requirement of a user for enabling the floating member 1 to be served as the sailboat or the flying craft.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A flyable sailboat, including:
   a floating member, having the front portion defined at the top end thereof being installed with a front support, wherein the top end of the front support is installed with at least one rotating device, the middle portion defined at the top end of the floating member is installed with a rear support, the top end of the rear support is installed with at least one buckle device, and the floating member is installed with one or a plurality of air pumps;
   one or a plurality of rear flaps, installed at the tail end of the floating member and respectively including a horizontal flap and a rotating vertical rudder, wherein the center defined at the bottom end of the horizontal flap is installed with the rotating vertical rudder extended to the bottom end of the floating member;
   two or a plurality of lateral flaps, respectively extended from two lateral sides of the floating member, wherein the lateral flap is formed as a plate-like member, and the top end of the lateral flap is installed with one or a plurality of air bags communicated with the air pump for blowing or discharging;
   at least one wind resisting device, installed on the rotating device of the front support of the floating member, and including at least one sail, at least one boom rod and at least one horizontal rod, wherein the center of the sail is installed with the boom rod having a tail rod and fastened on the rotating device, the horizontal rod is vertically installed on the boom rod and connected to the sail, the tail rod of the boom rod is respectively and correspondingly fastened with the buckle device of the rear support of the floating member and at the location of the floating member defined at the bottom end of the rotating device of the front support; and
   one or a plurality of power devices, installed at the tail end or at two lateral sides of the floating member.

2. The flyable sailboat as claimed in claim 1, wherein the horizontal flap of the rear flap is installed with an air bag communicated with the air pump for blowing or discharging.

3. The flyable sailboat as claimed in claim 1, wherein the rotating device installed on the front support of the floating member is able to vertically or horizontally rotate in a two dimensional or three dimensional manner.

4. The flyable sailboat as claimed in claim 2, wherein the rotating device installed on the front support of the floating member is able to vertically or horizontally rotate in a two dimensional or three dimensional manner.

5. The flyable sailboat as claimed in claim 1, wherein the lateral flap is rotatable.

6. The flyable sailboat as claimed in claim 2, wherein the lateral flap is rotatable.

7. The flyable sailboat as claimed in claim 3, wherein the lateral flap is rotatable.

8. The flyable sailboat as claimed in claim 4, wherein the lateral flap is rotatable.

* * * * *